Jan. 28, 1964
R. BRADT
3,119,718
APPARATUS AND METHOD FOR PRODUCING
REINFORCED MOLDING COMPOSITION
Filed Nov. 15, 1957
4 Sheets-Sheet 1
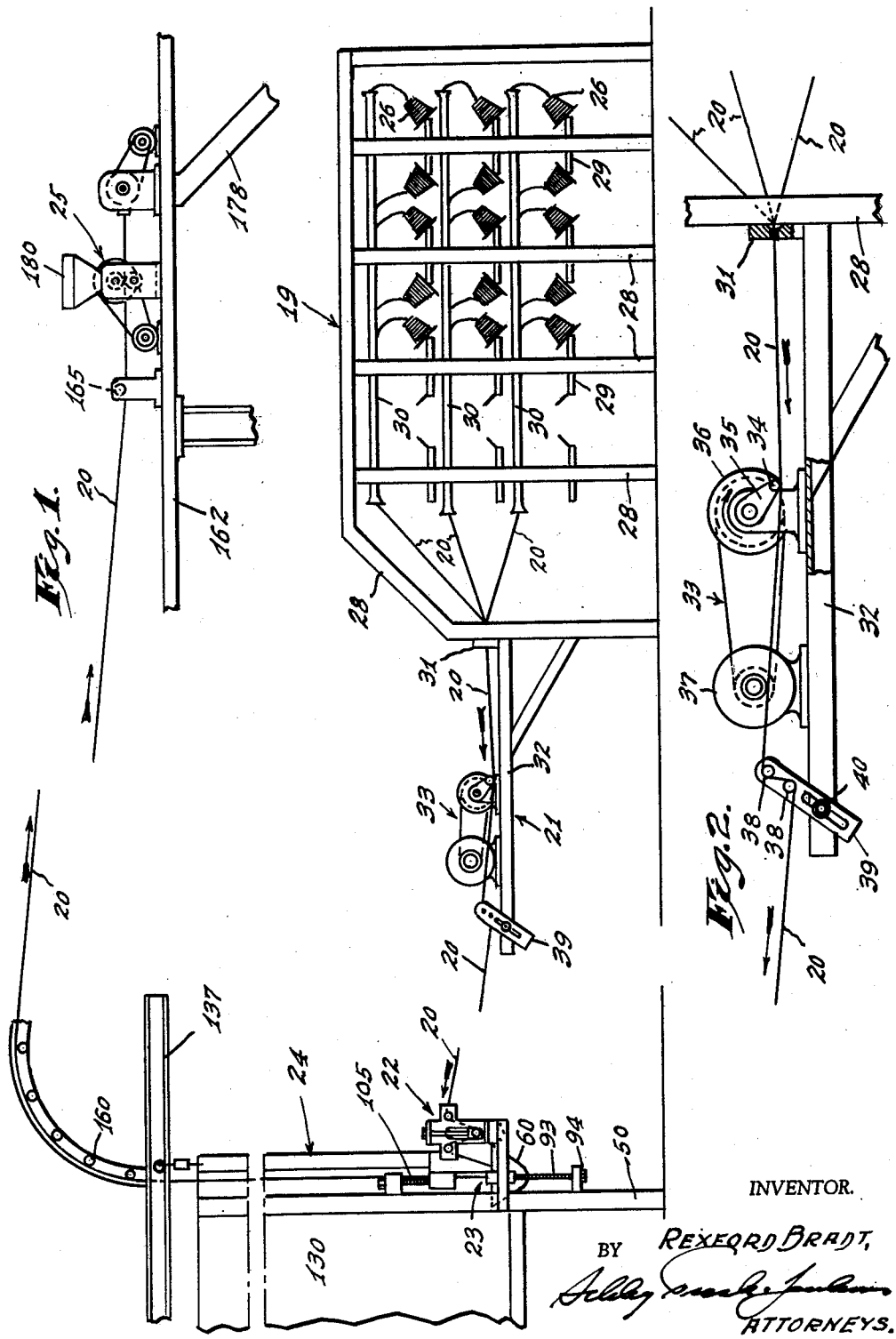
INVENTOR.
BY REXFORD BRADT,
ATTORNEYS.

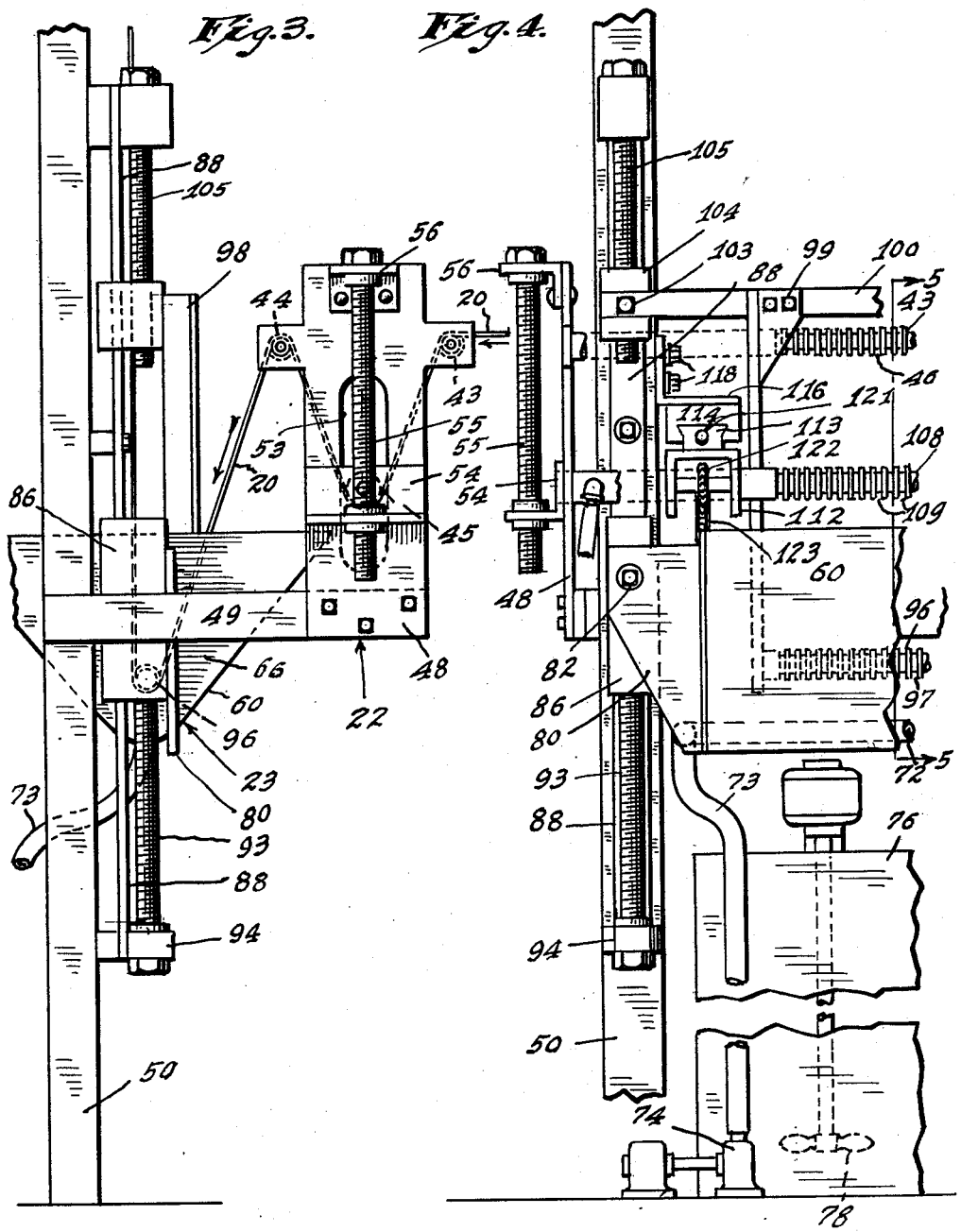

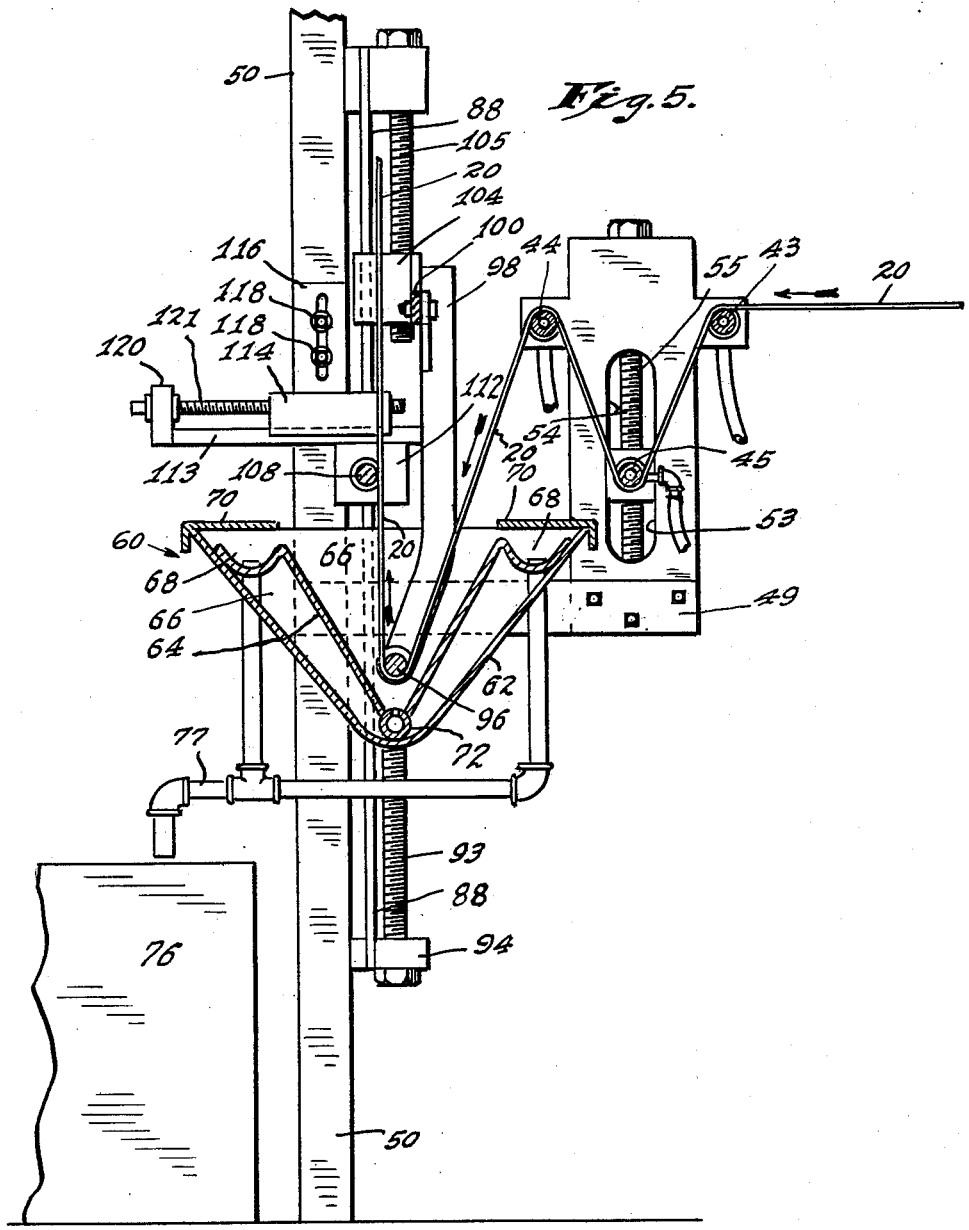

Jan. 28, 1964 R. BRADT 3,119,718
APPARATUS AND METHOD FOR PRODUCING
REINFORCED MOLDING COMPOSITION
Filed Nov. 15, 1957 4 Sheets-Sheet 4

INVENTOR.
REXFORD BRADT,
BY
ATTORNEYS.

3,119,718
APPARATUS AND METHOD FOR PRODUCING REINFORCED MOLDING COMPOSITION
Rexford Bradt, Warsaw, Ind., assignor to Fiberfil Corporation, Warsaw, Ind., a corporation of Indiana
Filed Nov. 15, 1957, Ser. No. 696,783
5 Claims. (Cl. 118—68)

This invention relates to the manufacture of a reinforced synthetic injection-molding composition in the form of granules or pellets each comprising a plurality of generally aligned filaments or threads of glass or other reinforcing material impregnated and sheathed by a thermoplastic synthetic resin. In my prior application Serial No. 327,935, filed December 24, 1952, now Patent No. 2,877,501, I disclosed such molding compounds and methods of producing them wherein glass roving or strand after immersion in a bath, preferably an emulsion, of a liquefied thermoplastic resin was passed through an inert atmosphere of elevated temperature to fuse the resin, after which the coated strand or roving was cooled and cut into lengths suitable for use in injection molding machines. The present application is directed primarily to improvements in the methods broadly disclosed in my prior application and to apparatus for practicing the improved methods.

The present invention, in its entirety, is characterized by two principal features. First, the apparatus is so constructed and arranged that the strand or roving may be substantially free from tension as it passes through the bath of liquefied resin, and second the heated, inert atmosphere is provided by hot products of combustion. To accomplish such results in the preferred means, I provide a vertically extending heating chamber directly above the bath of liquefied resin, so that all the weight of the roving or strand moving upwardly out of the bath and through the heating chamber is supported from above. The vertical heating chamber constitutes a portion of a path for circulating gases, other portions of such path containing a burner and a blower or fan for providing the circulation.

Although, as indicated, the arrangement of the apparatus permits the roving or strand to pass through the bath of liquefied resin in a substantially tensionless condition, it will usually be advisable to impart some tension to the roving or strand as it passes through the bath. The amount of liquefied resin picked up by the material passing through the bath depends to an extent on tension in the material; and I have found that the application of some tension promotes improved control over the proportion of glass to resin in the finished product. I therefore include in the apparatus a set of snubbing bars disposed in advance of the resin bath and relatively adjustable to vary their snubbing effect and the resultant tension they create in the material. In apparatus designed to coat a plurality of strands simultaneously, it is desirable to provide means in advance of the snubbing bars for equalizing the tension in the various strands.

Other features of the invention will become apparent from the following more detailed description and from the drawings, in which:

FIG. 1 is a side elevation of the complete apparatus;

FIG. 2 is a side elevation, in partial section, of the tension-equalizing section of the apparatus;

FIG. 3 is a side elevation showing the tension-adjusting and the treating sections;

FIG. 4 is a fragmental front elevation of the elements shown in FIG. 3;

FIG. 5 is a vertical section on the line 5—5 of FIG. 4;

Figure 6:
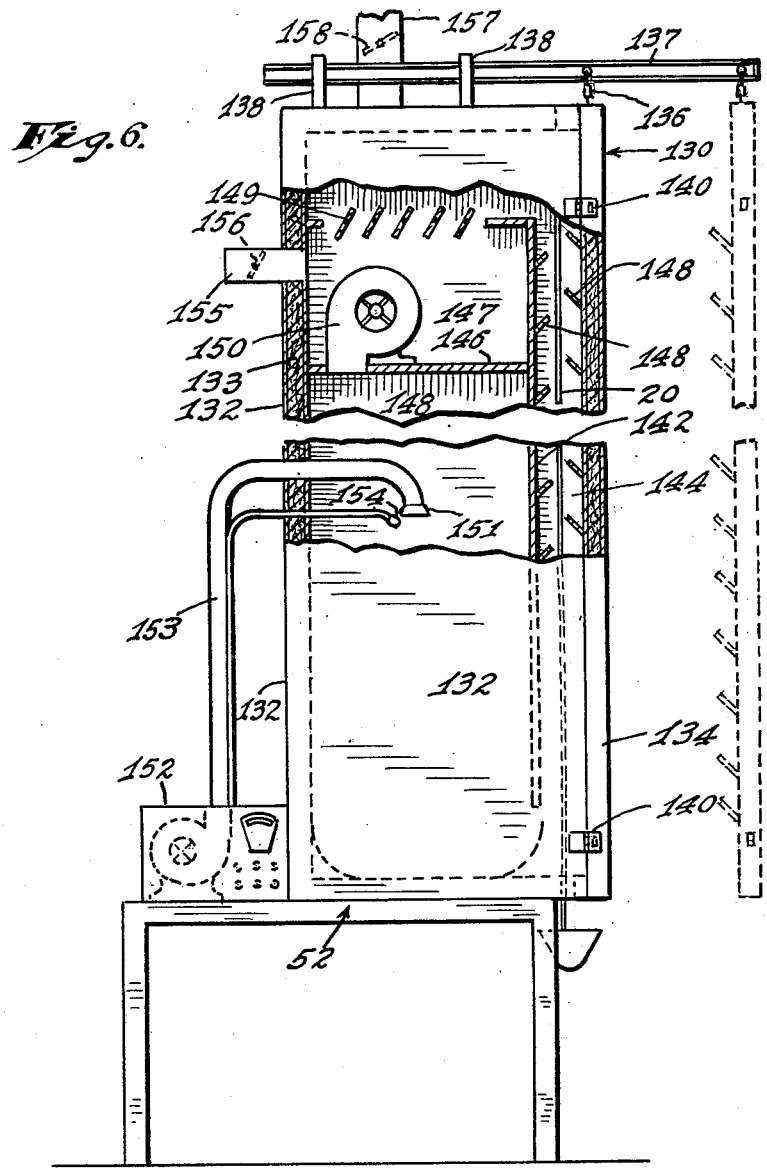
FIG. 6 is a side elevation, in partial section, of the oven.

In the apparatus illustrated in the drawings, lengths 20 of the reinforcing material to be treated pass successively from a creel cage 19, through a tension equalizing section 21, a tension adjusting section 22, an applicator section 23, and a curing section 24 to a feeding and cutting section 25. Such reinforcing material may be glass or other appropriate filamentary filler, and each length may contain any number of individual filaments or groups of filaments twisted or untwisted. Such lengths will hereinafter be referred to, without limitation, as strands.

As shown in FIG. 1, in order to process a plurality of strands 20 at a uniform and controlled rate, I have provided a creel cage 19 adapted to hold a plurality of strand-supply cops 26 in operative position. The cage 19 is constructed from any suitable structural frame members 28 to which are secured cop-holders 29 adapted to support the cops 26 in a position to permit an uninterrupted unwinding of the strands. The strands 20 are transported from their cops through the creel cage 19 in a plurality of horizontally disposed delivery tubes 30 mounted on the cage frame members 28 and leading to the end of the cage.

After leaving the delivery tubes 30 the strands pass through an aligning bar 31 mounted on a supporting frame 32 secured to the exit end of the creel cage 21. A series of openings are pierced in the bar 31 to receive the strands 20 and dispose them in the same general horizontal plane. Desirably, there is disposed beyond the aligning bar a tension-equalizing device designated in its entirety by the reference numeral 33 and comprising a feeder bar 34 extending transversely of the strands and secured to the outer ends of a pair of aligned cranks 35. One of the cranks has rigid with it a pulley 36 driven in a clockwise direction (FIGS. 1 and 2) by a motor 37. The device 33 is so positioned above the strands leaving the aligning bar that it engages the strands upon its downward swing and urges them forwardly out of the creel cage 19 and through the aligning bar 31.

Beyond the feeder bar 34 in the direction of feed the strands 20 desirably pass partially around each of a pair of spaced, horizontal snubbing bars 38 mounted in members 39 secured to the frame 32 by bolts 40. Preferably, the members 39 are slotted for passage of the bolts 40 and are adjustable about the axis of the bolts, thus permitting variations in the length of the arcs of contact between the strands and the scrubbing bars.

In order to control the tension in the strands as they pass through the applicator section 23, the strands next enter the tension adjusting section 22 comprising a pair of tension adjusting bars 43 and 44 disposed in the same horizontal plane above, and on each shide of, a third tension adjusting bar 45. Preferably, each of the bars 43 and 44 is provided with a series of spaced annular grooves 46; each groove being adapted for the reception of a single strand to keep the strands separated and thereby prevent any tangling and snarling. The bars 43 and 44 are rigidly secured at each of their ends to mounting plates 48 connected by means of arms 49 to the front legs 50 of a mounting frame 52 forming the basic structural support for the whole treating apparatus. The ends of the bar 45 are slidably received in a vertically extending slot 53 cut in each of the mounting plates 48. Holding the bar 45 in sliding engagement with the plates 48 are brackets 54 extending outwardly from the plates 48 and operatively connected by means of adjusting screws 55 to a second pair of brackets 56 fixedly mounted on the plates 48. The distance between the fixed bars 43 and 44 is desirably several times the diameter of the bars so that, by adjusting the screws 55 to move the bar 45 vertically with respect to the bars 43 and 44, the angle of contact of the strands with each bar may be varied to control the snubbing action of the bars and regulate the tension on the strands as they pass to and through the applicator section 23. Such adjustment is desirable, as it permits control of the amount of liquefied resin picked up by the strands in the applicator section. Light tension, by permitting separation of filaments in the resin bath, promotes impregnation of the strands and increases the amount of resin carried from the bath on and in the strands. Conversely, relatively great tension resists separation of the filaments and reduces resin pick-up.

The bars 43, 44, and 45 are desirably hollow so that water or other coolant can be circulated through them. Cooling of the bars promotes setting of any size the strands may contain and also, by condensing moisture in the adjacent atmosphere, provides lubrication, for the strands as they are drawn over the bars.

Having moved through the tension adjusting section, the strands enter the applicator section 23 comprising an applicator trough 60 containing a bath of the thermoplastic resin which impregnates and sheaths the strands. As shown in FIG. 5 the trough 60 has a generally V-shaped cross-section formed from outer and inner walls 62 and 64 and end walls 66. Conveniently, the inner wall 64 is bent adjacent its upper edges to form overflow channels 68 extending the length of the trough 60 along its upper edges for maintaining a constant level of resin in the trough. To prevent dirt and other materials from contaminating the resin, I have further provided removable cover plates 70 slidably received along the upper trough edges to cover the channels 68.

The liquid resin material preferably employed in this process is a synthetic thermoplastic latex emulsion having an adjusted pH in the range of 8–9 and containing, in suspension, finely divided particle of solid resin. An example of such a latex emulsion includes polystyrene emulsified in water in a desired ratio. Other factors remaining constant, a greater resin to water ratio will produce a more viscous resin mixture, which will result in a greater resin pick up by the rovings passing through the trough.

The trough 60 is kept filled with the resin by means of an inlet pipe 72 which extends along the bottom of the trough and is provided with a series of spaced, upwardly directed outlet orifices. The pipe 72 is connected through a hose 73 (FIG. 4) to the outlet of a pump 74 which receives emulsion from a supply tank 76. Desirably, the pump 74 operates continuously, excess resin supplied to the trough spilling over into the overflow channels 68 to be returned through an overflow pipe 77 to the supply tank 76. Thus the resin can be maintained at a constant depth and any unused or excess resin can be recycled. Conveniently, the tank 76 is provided with any suitable type of agitator 78 which keeps the resin constituents in suspension. Preferably, the orifices in pipe 72 are small enough that the emulsion discharged through them will possess sufficient velocity to maintain the resin bath in a state of agitation.

Extending outwardly from each trough end wall 60 is a mounting bracket 80 secured by means of a bolt 82 to a trough adjustment slide 86 adapted to be moved vertically for positioning the trough in the desired elevation. As shown in FIGS. 3 and 4, the slides 86 are channeled on tracks 88 rigidly supported from the frame legs 50. Each of the slides 86 is vertically adjustable on its track by an adjustment screw 93 having its upper end received in a tapped opening in the slide and its lower end rotatably mounted in fixed axial position in a stationary block 94 mounted on the track 88. Thus when the screw 93 is turned the slide 86 will move vertically on the track 88 to position the trough 60 at the desired elevation. By making each end of the trough independently adjustable, it can be leveled to provide a uniform depth of the resin contained therein. The vertical trough adjustment also permits variation in the distance the treated strands travel before becoming subjected to the heat of the oven.

Disposed within the trough 60 and extending substantially the length thereof below the surface of the emulsion is a roving guide bar 96 having a plurality of annular grooves 97 each adapted to receive one of the strands 20. The ends of the guide bar 96 are received in openings formed in the lower end of a pair of brackets 98 rigidly connected at their upper ends, as by bolts 99, to a transversely extending bar 100. Each end of the bar 100 is attached by means of a bolt 103 to a vertical adjusting means similar to the trough adjusting mechanism and comprising a slide 104 vertically movable on the track 88 by means of an adjusting screw 105. By adjusting the vertical positions of the slides 104 along the tracks 88 it is possible to vary the height of the guide bar 96 and control the length of travel of the rovings through the resin bath, thereby providing another means of controlling the amount of resin picked up by the rovings.

Supported above the guide bar 96 and slightly rearwardly thereof is a rotating doctor bar 108 (FIGS. 4 and 5) also provided with a series of annular grooves 109 adapted for the reception of the resin coated strands. As shown, each end of the doctor bar 108 is journaled in a bearing member 112 secured to a slide 113 which is received for horizontal sliding movement in a guide block 114. The guide blocks 114 at opposite ends of the doctor bar may be supported from the frame legs 50 through L-shaped brackets 116. Desirably the guide blocks 114 are arranged for vertical adjustment to vary the height of the doctor bar; and to this end, the vertical leg of each bracket 116 may be provided with a vertically extending slot receiving bolts 118 by means of which the brackets are attached to the legs 50. To effect horizontal adjustment of the slides 113, each of them may be provided at its rear end with an ear 120 rotatably receiving and holding in fixed axial position an adjusting screw 121 which is received in a screw-threaded opening in the associated guide block 114. Adjustment of the doctor bar, especially the horizontal adjustment which controls the extent of contact of the bar with the impregnated strands, may be employed to regulate the amount of excess resin removed by the bar 108.

As shown in FIG. 4, the doctor bar 108 is rotated by a sprocket 122 mounted on one end of said bar and driven through a chain 123 from any convenient driving means.

Leaving the doctor bar 108, the coated strands pass upwardly through the curing section 24 which, as shown in FIG. 6, comprises a vertical oven 130 mounted on the frame 52. The oven comprises side and back walls 132 suitably insulated with glass wool 133 or the like, and a door 134 closing the front of the oven 130. Conveniently, the door 134 is supported for opening and closing by means of a pair of trolleys 136 riding on a pair of tracks 137 mounted above the top of the oven on brackets 138. Desirably, the tracks 137 extend sufficiently forward of the oven to permit the door 134 to be opened to the dotted line position shown in FIG. 6, thereby permitting access to the oven interior. Locking is accomplished by a plurality of latches 140 mounted along each side of the door 134 and engageable with the oven side walls to hold the door in a tightly closed position.

The oven door 134 in combination with a vertical disposed oven partition 142 defines a curing channel or chamber 144 extending vertically for the height of the oven for the reception of the coated strands as the coating emulsion is dried and the resin-residue fluxed. Both the bottom and the top of the oven 130 are recessed at the front of the oven to provide inlet and exit passages for the strands at each end of the curing chamber 144. Preferably, both the panel 142 and the door 134 are provided with a plurality of vertically spaced transversely extending baffles 148 disposed in staggered relation and inclined upwardly to cause hot gases flowing upwardly through the chamber 144 to pass repeatedly back and forth through the band of strands.

The space between the rear oven wall and the vertical partition 142 is divided by a horizontal partition 146 into upper and lower chambers 147 and 148. The lower chamber 148 communicates freely with the lower end of the curing chamber 144, while communication of the upper end of such curing chamber with the upper chamber 147 is under the control of a series of adjustable vanes 149. One or more blowers 150, conveniently supported on the partition 146, withdraw gases from the upper chamber and discharge them into the lower chamber, thus forcing a circulation in which gases flow upwardly through the curing chamber 144 in contact with the coated strands 20.

Heat for the resin curing operation is provided by a burner 151 which discharges downwardly in the chamber 148, such burner being supplied with a combustible mixture of fuel and air by means including a blower 152 delivering the mixture into a conduit 153 which extends to the burner. Preferably, the fuel employed is fuel gas. If desired, the oven temperature may be automatically controlled, in which event a pilot burner 154 is associated with the main burner 151. The only escape for the products of combustion from the burner 151 is upwardly through the curing chamber 144 in contact with the treated strands 20.

The constitution of the atmosphere to which the treated strands are subjected in the chamber 144 can be modified as desired by providing the oven with controlled inlet and outlet openings. As shown, the chamber 147 is provided with an inlet 155 controlled by an adjustable damper 156, while an exhaust flue 157 controlled by a damper 158 communicates with the oven between the top of chamber 144 and the vanes 149. To increase the proportion of air in the atmosphere of the curing chamber, the dampers 156 and 158 are moved toward open position and the vanes 149 toward closed position. Conversely, to decrease the proportion of air in the mixture, the dampers 156 and 158 are moved toward closed position and the vanes 149 opened. In most instances, I have found it preferable to close the inlet damper 156 completely, to close exhaust damper 158 at least partially, and to adjust the vanes 149 so that the pressure in the chamber 147 will be approximately atmospheric. In this way, the oven is in effect substantially sealed except for the openings through which the strands 20 enter and leave and the atmosphere in the curing chamber, consisting essentially of nothing but products of combustion, will be effectively inert and non-oxidizing.

Figure 7:
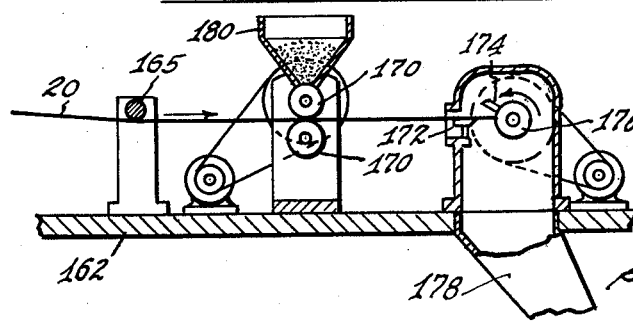
FIG. 7 is a side elevation of the feeding and cutting section of the apparatus.

Emerging from the top of the oven 130, the strands 20 pass (FIG. 1) over a series of horizontal guide bars 160 and thence to the feeding and cutting section 25, which is conveniently supported on a floor 162 above the creel cage 19. As shown in FIG. 7, the section 25 comprises a guide bar 165 which guides the strands between two power driven feed rolls 170, through the action of which the strands are drawn through the whole apparatus. The rolls 170 are desirably faced with rubber or other compressible material to grip the coated strands firmly and to exert thereon the desired clamping pressure necessary for the feeding action. Beyond the rolls I locate means for cutting the strands into predetermined lengths. As shown, such cutting means comprises a stationary blade 172 cooperating with a rotating blade 174 carried on a rotatable power driven drum 176. As the drum 176 rotates, the coated strands passing across the face of the stationary blade 172 are sheared into short lengths by the blade 174, and the cut pellets fall into a chute 178 which may conduct them by gravity and discharge them into suitable containers. The lengths of the pellets into which the strands are cut can be controlled by adjusting the speed of the drum 176 relatively to the peripheral speed of the feed rollers 170.

If desired, powdered lubricant, such as zinc stearate, may be applied to the strands as they pass through the rolls 170. For that purpose, I may place a supply of the lubricant in a hopper 180 which is supported above the upper roll 170 in such fashion that the surface of the roll forms in effect the bottom of the hopper. Powdered material adhering to the surface of the upper roll is transported thereby and applied to the strands 20.

In setting the apparatus up for operation, cops 26 to the number of strands 20 to be treated are placed on the holders 29 of the creel cage and the strands are led through the tubes 30 and over the course indicated in FIG. 1 to the feed rolls 170. In that operation, the guide bar 96 of the treating apparatus may be raised above the emulsion in the trough 60 and the oven door 134 may be opened. Conveniently, the creel cage 19 is built to support a spare cop 26 adjacent each cop in use so that as each cop is exhausted the end of its strand can be tied to the strand of the spare cop, thus making possible continuous operation of the apparatus.

With the strands strung as just indicated, the oven door is closed and the oven placed in operation. A supply of emulsion is placed in the tank 76, the pump 74 is started to fill the trough 60, and the guide bar 96 is lowered into the trough. When the oven has reached operating temperature, the feed rolls 170 and the motor 37 of the tension-equalizing mechanism 33 are started. When the loading end of the treated portions of the strands have passed through the feed rolls 170, the strands are cut between such rolls and the cutting mechanism 172–174 and the treated strand-portions are directed into such cutting mechanism. The apparatus is then ready for normal, continuous operation.

In such operation, the strands are pulled through the entire apparatus primarily by the action of the feed rolls 170. While friction between the strands and the bar 34 of the tension equalizing mechanism favors progress of the strands, the bar engages the strands only intermittently during, say, the lower quarter or third of each of its revolutions. While in contact with the strands, it draws them through the feed tubes 30, and as it moves out of engagement with the strands it leaves slack in each. Between the snubbing bars 38 and the tension-adjusting mechanism 22 the strands sag somewhat under their own weight, creating additional slack which permits the strands to move through the treating and curing sections at a substantially constant rate even though their movement over the snubbing bars 38 is to an extent intermittent as a result of the action of the bar 34. The bar 34 should rotate at such a rate that the slack it creates between the stationary guide bar 31 and the rotating bar 34 is never entirely taken up. Thus, depending upon the relative positioning of the bars 38, substantially the only tension in the strands as they reach the first bar 43 of the tension adjusting section may be that due to the weight of the strands. Preferably, the bars 38, which are desirably polished, are disposed so as to create just enough friction to prevent the strands from moving rearwardly over them as the bar 34 descends in contact with the strands.

Leaving the emulsion bath, the impregnated and coated strands pass directly upwardly past the doctor bar 108 and into the curing chamber 144 of the oven. The doctor bar removes excess resin from the strands and also brings back into the body of the strand any loose filaments which have separated therefrom during passage through the emulsion.

During their passage through the oven 130, the resin impregnated strands are first dried and the resin-residue is then fused to the individual filaments or ends comprising each strand to form a solid mass of plastic sheathing and interconnecting such filaments or ends. To accomplish such drying and fusing, the oven is maintained at a temperature sufficient to remove substantially all of the moisture from the resin. It will be understood, of course, that this drying and fusing operation has a time-temperature relationship so that the operating oven temperature will be adjusted with respect to length of time that the rovings are retained in the oven.

To obtain maximum impregnation of the strands by the emulsion of the bath, the strand-portions in the bath should be completely free of tension; but some slight tension is necessary to maintain the strands in the grooves of the various grooved bars over which they pass and to prevent their whipping unduly as they pass upwardly through the oven. The weight of the strand-portions occupying the oven is carried entirely from above and adds nothing to the tension existing in those portions of the strands occupying the bath. As a result, the tension in each strand at the top of the oven need exceed the weight of the vertical strand-stretch only by the relatively insubstantial amount necessary to control the path of movement of the strand into and through the bath.

The bars 160 over which the treated strands pass after leaving the oven may be water cooled to speed the cooling and setting of the resin. Such a rapid cooling is desirable in certain applications where the resin being used is highly susceptible to being oxidized and discolored while it is in a heated, semi-plastic state. Further cooling occurs by reason of contact of the strands with the atmosphere as they pass from the bars 160 to the feed rolls 170. In any event, by the time they reach such feed rolls the strands should have been cooled to a point such that they will not be unduly flattened by the pressure of the feed rolls.

Finally, the coated and cooled strands are chopped into predetermined lengths by the shear-bars 172, 174, and the pellets constituting the final product fall through the chute 178 into storage or shipping containers.

It will be understood that the specific apparatus shown and described above is set forth merely by way of example and that the true scope of the invention is to be measured by the appended claims.

I claim as my invention:

1. In apparatus for producing a reinforced molding compound, an elongated trough adapted to contain a liquid bath, an oven having a vertically extending curing chamber located above said trough, said oven including a burner chamber communicating with the lower end of said curing chamber, a burner in said burner chamber, gas-circulating means for withdrawing gases from the upper end of the curing chamber and discharging them into the burner chamber for upward passage through the curing chamber after admixture in said burner chamber with the products of combustion from the burner, means for controlling gas flow from the upper end of the curing chamber to the gas circulating means, said oven having a valved outlet opening between the curing chamber and said flow-controlling means and a valved air-inlet opening between the flow-controlling means and the circulating means, and means for drawing spaced strands of reinforcing material through the liquid bath in said trough and upwardly therefrom through the curing chamber, said curing chamber being provided with vertically staggered baffles disposed on opposite sides of said strands and upwardly inclined to cause the upwardly flowing gases in the curing chamber to pass back and forth through the spaces between the strands.

2. In apparatus for producing a reinforced molding compound, an elongated trough adapted to contain a liquid bath, an oven having a vertically extending curing chamber located above said trough, said oven including a burner chamber communicating with the lower end of said curing chamber, a burner in said burner chamber, gas-circulating means for withdrawing gases from the upper end of the curing chamber and discharging them into the burner chamber for upward passage through the curing chamber after admixture in said burner chamber with the products of combustion from the burner, means for controlling gas flow from the upper end of the curing chamber to the gas circulating means, said oven having a valved outlet opening between the curing chamber and said flow-controlling means and a valved air-inlet opening between the flow-controlling means and the circulating means, and means for drawing spaced strands of reinforcing material through the liquid bath in said trough and upwardly therefrom through the curing chamber.

3. In apparatus for producing a reinforced molding compound, an elongated trough adapted to contain a liquid bath, an oven having a vertically extending curing chamber located above said trough, said oven including a burner chamber communicating with the lower end of said curing chamber, a burner in said burner chamber, gas-circulating means for withdrawing gases from the upper end of the curing chamber and discharging them into the burner chamber for upward passage through the curing chamber after admixture in said burner chamber with the products of combustion from the burner, adjustable means for causing the addition of air to the gases passing through said curing chamber, and means for drawing spaced strands of reinforcing material through the liquid bath in said trough and upwardly therefrom through the curing chamber.

4. In apparatus for impregnating and sheathing a plurality of strands of filamentary material, a trough adapted to contain a bath of strand-impregnating liquid, means for supporting a plurality of cops each constituting a source of one of said strands, and means for drawing and guiding the strands from said cops and through said bath, said last-named means including an aligning device for bringing into a common horizontal plane the several strands leaving the cops, a tension controlling device located between said aligning device and said trough and comprising a pair of horizontal bars each partially encircled by the strands, and a tension-equalizing device disposed between the aligning and tension-controlling devices, said tension-equalizing device comprising a horizontal bar and power-driven means for revolving said bar about an axis eccentric to the bar and so positioned that during a portion of each revolution the bar will engage and deflect the strands to substantially equal extents.

5. In apparatus for producing a reinforced molding compound, an elongated trough adapted to contain a liquid bath, an oven having a vertically extending curing chamber located above said trough, means for heating said curing chamber, means for drawing spaced strands of reinforcing material through the liquid bath in said trough and thence upwardly through said curing chamber, means for maintaining a substantially constant depth of bath-liquid in said trough, and means supporting said trough for vertical adjustment toward and away from said curing chamber to vary the length of the path traveled by the strands after leaving the path and before entering the curing chamber.

References Cited in the file of this patent
UNITED STATES PATENTS
92,210    Richardson _____ July 6, 1869
(Other references on following page)

UNITED STATES PATENTS

| | | |
|---|---|---|
| 289,773 | Johnston | Dec. 4, 1883 |
| 806,574 | Rupley | Dec. 5, 1905 |
| 806,575 | Rupley | Dec. 5, 1905 |
| 890,782 | Masurel-Leclercq | June 16, 1908 |
| 1,034,205 | Cogburn | July 30, 1912 |
| 1,414,462 | Frederick | May 2, 1922 |
| 2,040,105 | Ritzert | May 12, 1936 |
| 2,070,035 | Weiss | Feb. 9, 1937 |
| 2,308,767 | Mayes | Jan. 19, 1943 |
| 2,466,808 | Henning | Apr. 12, 1949 |
| 2,491,409 | Kropa et al. | Dec. 13, 1949 |
| 2,514,187 | Bosomworth | July 4, 1950 |
| 2,554,803 | Wysocki | May 29, 1951 |
| 2,590,586 | Thompson et al. | Mar. 25, 1952 |
| 2,669,031 | Chase et al. | Feb. 16, 1954 |
| 2,669,788 | Drum et al. | Feb. 23, 1954 |
| 2,730,455 | Swann | Jan. 10, 1956 |
| 2,739,567 | Jones et al. | Mar. 27, 1956 |
| 2,763,563 | Clougherty et al. | Sept. 18, 1956 |
| 2,775,022 | Davis | Dec. 25, 1956 |
| 2,795,054 | Bowen | June 11, 1957 |
| 2,804,694 | Clipsham | Sept. 3, 1957 |
| 2,846,752 | Lessig | Aug. 12, 1958 |
| 2,875,094 | Bloem et al. | Feb. 24, 1959 |
| 2,881,732 | Chrystman | Apr. 14, 1959 |